(12) United States Patent
Renn

(10) Patent No.: US 9,371,137 B2
(45) Date of Patent: Jun. 21, 2016

(54) DOWNED AIRCRAFT LOCATING SYSTEM

(71) Applicant: Kevin Renn, Fort Myers, FL (US)

(72) Inventor: Kevin Renn, Fort Myers, FL (US)

(*) Notice: Subject to any disclaimer, the term of this patent is extended or adjusted under 35 U.S.C. 154(b) by 0 days.

(21) Appl. No.: 14/846,273

(22) Filed: Sep. 4, 2015

(65) Prior Publication Data

US 2016/0068273 A1 Mar. 10, 2016

Related U.S. Application Data

(60) Provisional application No. 62/046,595, filed on Sep. 5, 2014.

(51) Int. Cl.
*B64D 25/14* (2006.01)
*B64D 25/20* (2006.01)
*B63B 45/00* (2006.01)

(52) U.S. Cl.
CPC .. *B64D 25/20* (2013.01); *B63C 9/21* (2013.01)

(58) Field of Classification Search
CPC ........ B64D 25/00; B64D 25/02; B64D 25/14; B64D 25/20; B63C 7/26; B63C 9/21; B63C 9/22; B63C 9/1055; B63C 9/20; B63B 2201/08; B63B 2201/14; G08B 5/002

USPC .............. 340/947, 981, 982, 984; 244/31, 33, 244/190, 225; 441/7, 11, 13, 30; 116/124 B, 116/210, 32, 209

See application file for complete search history.

(56) References Cited

U.S. PATENT DOCUMENTS

| | | | | |
|---|---|---|---|---|
| 2,923,917 A * | 2/1960 | McPherson et al. | ... | B64D 25/20 116/210 |
| 4,048,565 A * | 9/1977 | Rice, Sr. | ................ | H04B 1/034 244/33 |
| 4,405,099 A * | 9/1983 | Bolen | .................... | B64D 25/20 116/210 |
| 6,032,607 A * | 3/2000 | Ashline | .................... | B63C 7/26 116/210 |

* cited by examiner

*Primary Examiner* — Hung T Nguyen
(74) *Attorney, Agent, or Firm* — Dunlap, Bennett & Ludwig PLLC

(57) ABSTRACT

A system for locating a downed aircraft is provided. The system includes a canister. The canister has an internal housing and a door. The door covers an opening leading into the internal housing. The present invention includes a plurality of inflatable pods having a light and a battery powering the light. The pods include a deployed position and a stowed position. The stowed position includes the deflated pods within the canister and the deployed position includes the inflated pods released from the canister and inflated. When an aircraft is crashing, the canister may be released from the aircraft, the pods may be released from the canister and inflated, and the light may be powered.

12 Claims, 5 Drawing Sheets

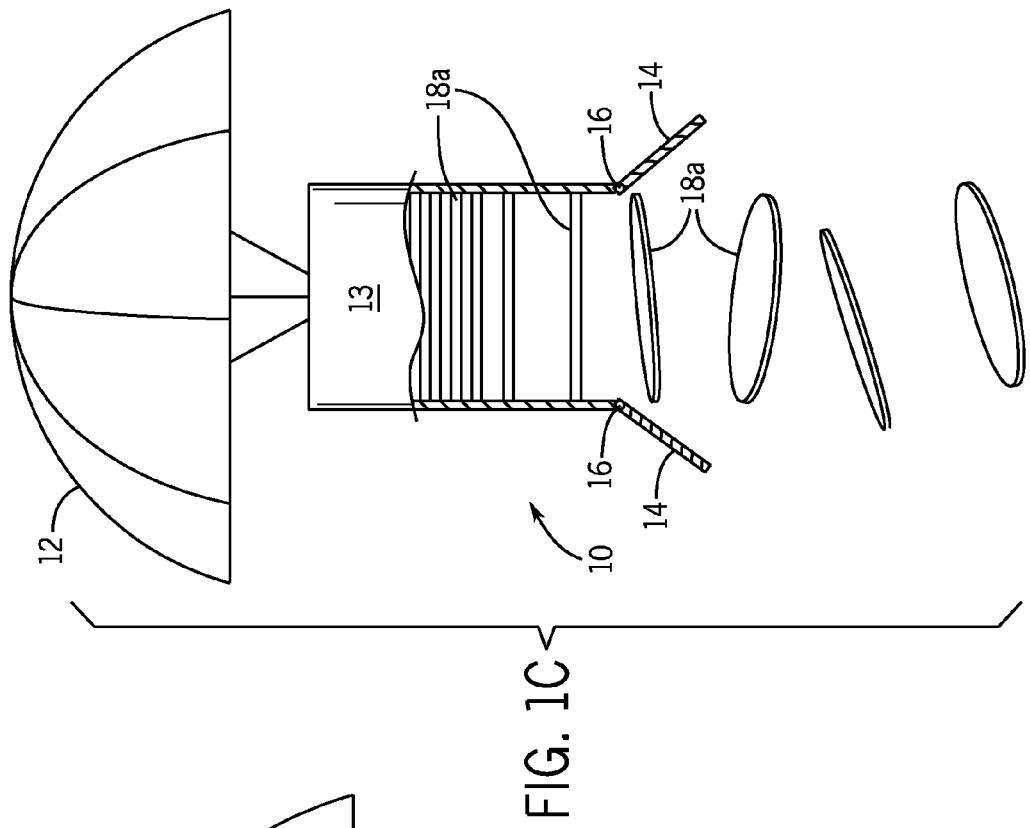
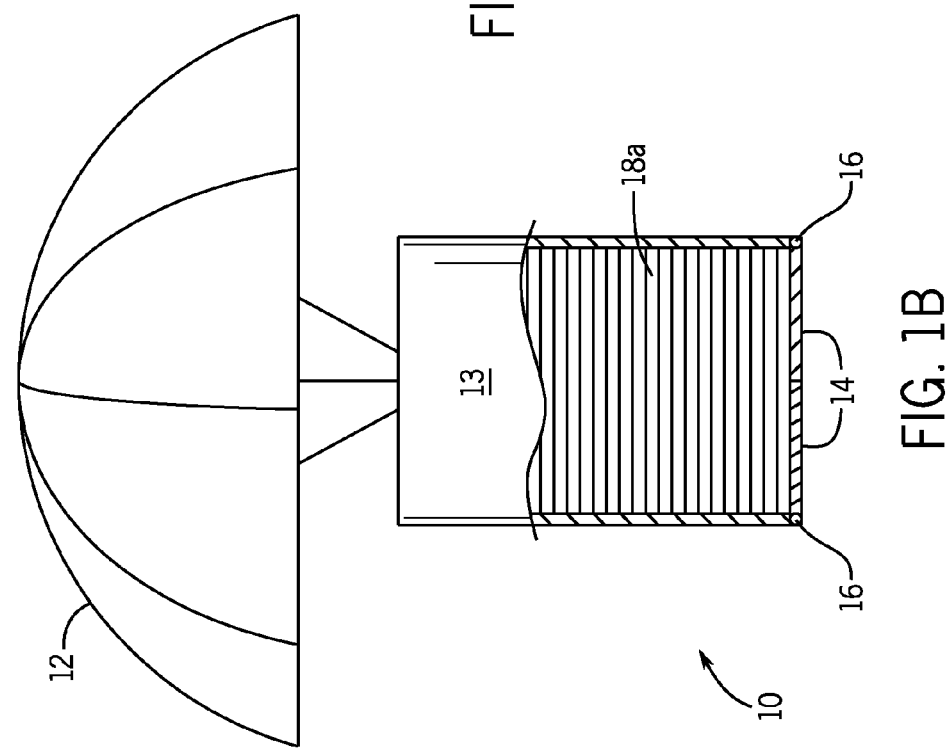

DOWNED AIRCRAFT LOCATING SYSTEM

CROSS-REFERENCE TO RELATED APPLICATION

This application claims the benefit of priority of U.S. provisional application No. 62/046,595, filed Sep. 5, 2014, the contents of which are herein incorporated by reference.

BACKGROUND OF THE INVENTION

The present invention relates to downed aircraft and, more particularly, to a downed aircraft locating system.

An airplane is a powered, fixed wing aircraft that is propelled forward by thrust from a jet engine or propeller. Airplanes come in a variety of sizes, shapes, and wing configurations. The broad spectrum of uses for airplanes includes recreation, transportation of goods and people, military, research, maritime and aerospace applications. Currently, when airplanes crash in the ocean, the debris of the airplane may be difficult to find, causing many man hours and money to be spent.

As can be seen, there is a need for a novel system and method of finding downed aircraft.

SUMMARY OF THE INVENTION

In one aspect of the present invention, a system for locating a downed aircraft comprises: a canister comprising an internal housing and a door covering an opening leading into the internal housing, wherein the door is opened when the canister is deployed from an aircraft; a plurality of inflatable pods each comprising a light and a battery powering the light, wherein the plurality of inflatable pods comprise a deployed position and a stowed position, wherein the stowed position comprises the inflatable pods deflated within the canister, and the deployed position comprises the inflatable pods released through the opening of the canister and inflated.

These and other features, aspects and advantages of the present invention will become better understood with reference to the following drawings, description and claims.

BRIEF DESCRIPTION OF THE DRAWINGS

FIG. 1B is a side elevation view of an embodiment of the present invention with parts broken away showing the second step of deployment;

FIG. 1C is a side elevation view of an embodiment of the present invention showing the final step of deployment;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a downed aircraft locating system including: a container deployable from an aircraft; and a plurality of pods or balloons releasable from the container. The pods or balloons include at least a light and a battery pack. The present invention may be used with airplanes, helicopters, aerospace aircraft and the like.

The present invention is an air sea system to locate downed aircraft within 1 to 4 days after the crash. In certain embodiments, flat pancake balloons would land at sea. The balloons may include power packs in them with bright lights. The lights may flash or may be constantly turned on.

Figure 1A:
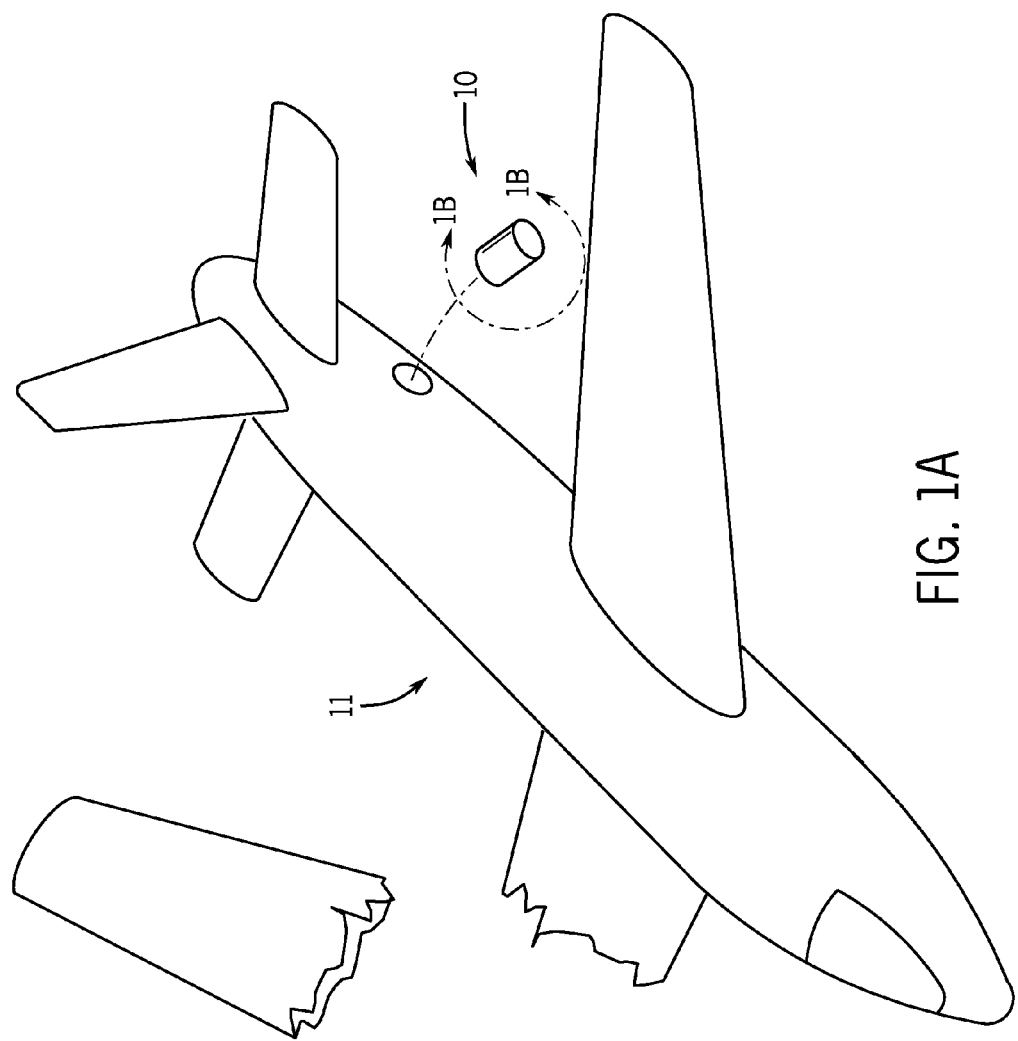
FIG. 1A is a perspective view of an embodiment of the present invention showing the first step of deployment.
Figure 2:
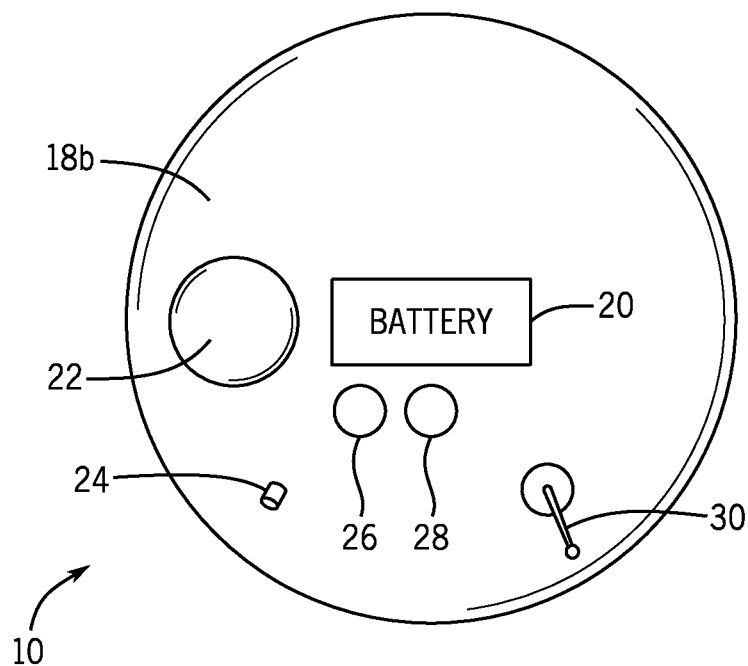
FIG. 2 is a top plan view of an embodiment of the present invention deployed.
Figure 3:
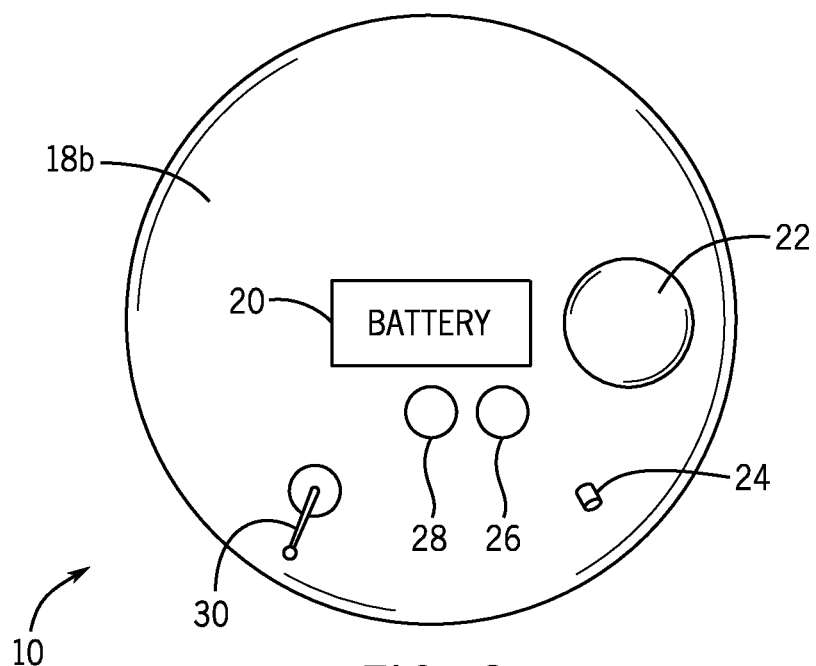
FIG. 3 is a bottom plan view of an embodiment of the present invention deployed.
Figure 4:
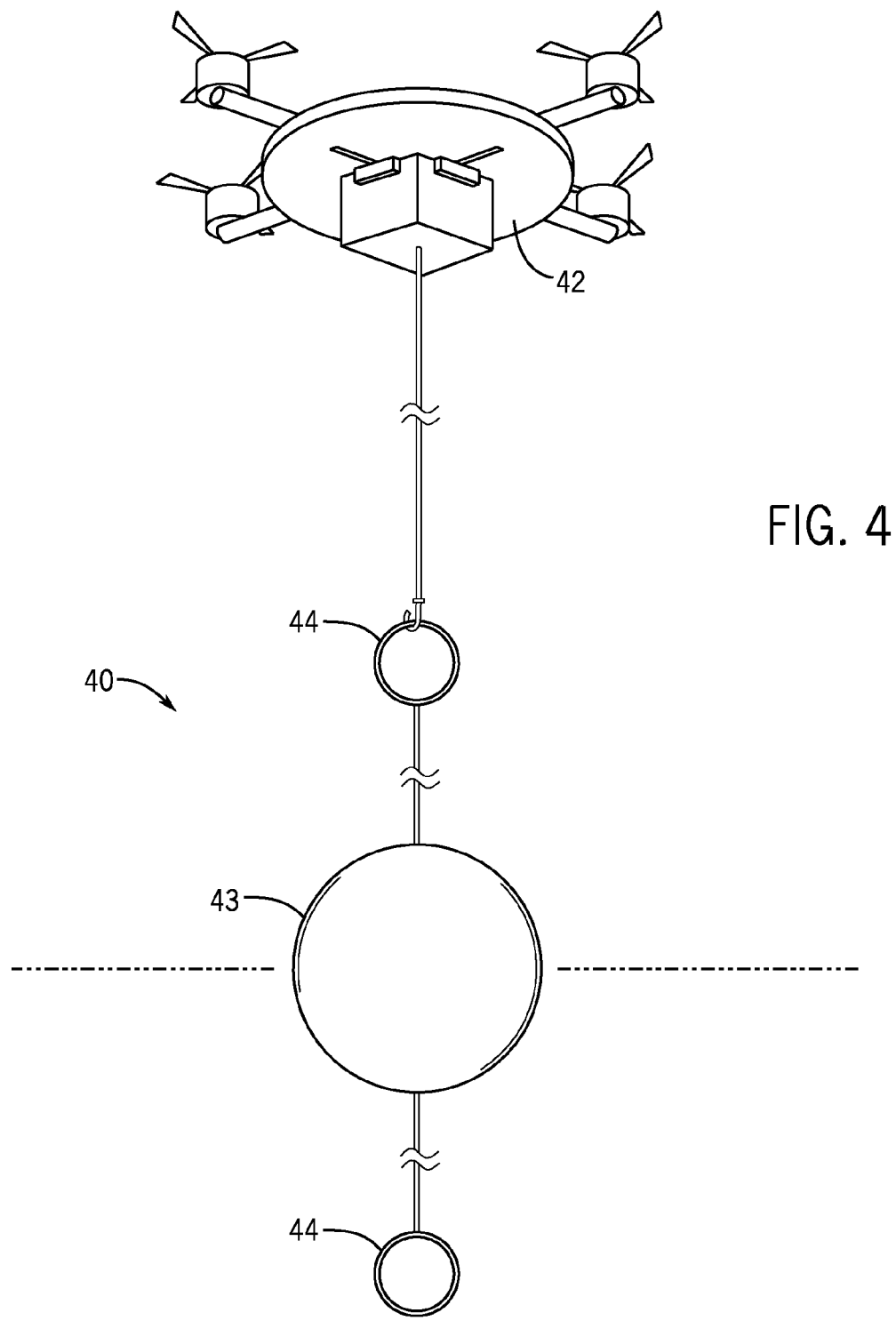
FIG. 4 is a perspective view of an embodiment of the present invention being retrieved.
Figure 5:
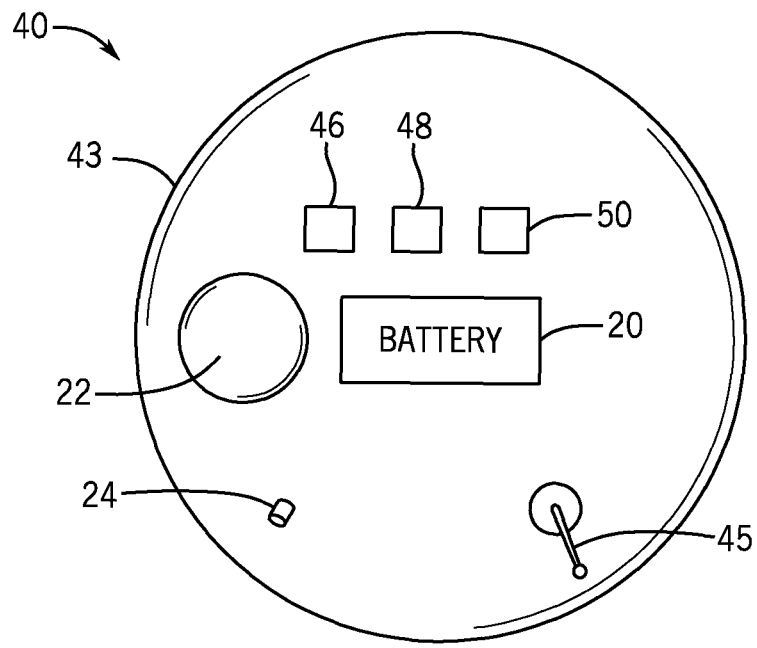
FIG. 5 is a top plan view of an embodiment of the present invention.
Figure 6:
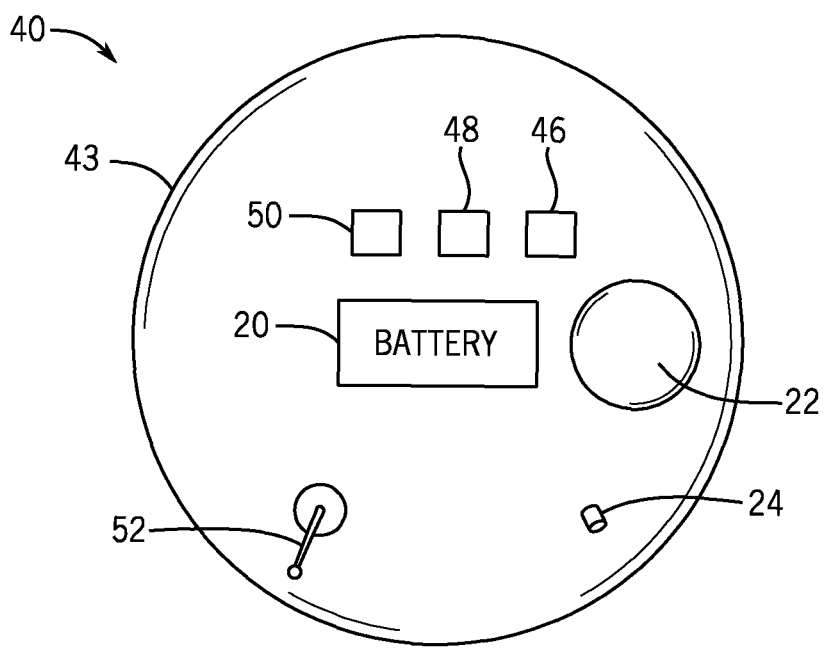
FIG. 6 is a bottom plan view of an embodiment of the present invention.

Referring to FIGS. 1 through 6, the present invention includes a system for locating a downed aircraft 10. The system 10 includes a canister 13. The canister 13 has an internal housing and a door 14. The door 14 covers an opening leading into the internal housing. The present invention includes a plurality of inflatable pods 18 having a light 22 and a battery 20 powering the light 22. The pods 18 include a deployed position and a stowed position. The stowed position includes the deflated pods 18a within the canister 13 and the deployed position includes the inflated pods 18b released from the canister 13 and inflated. When an aircraft 11 is crashing, the canister 13 may be released from the aircraft 11, the pods 18 may be released from the canister 13 and inflated, and the light 22 may be powered.

The canister 13 of the present invention may include a cylindrical shape and may fit within a shoot of the aircraft 11. A deploy switch is operable to release the canister 13 from the shoot. The aircraft 11 may include an altitude sensor operable to control the deploy switch. Therefore, when the aircraft 11 is losing altitude at a higher pace than a normal descent, the canister 13 may be released from the shoot. A parachute 12 may be secured to the canister 13 so that the canister 13 may descend at a slower speed, allowing for the pods 18 to be released. In certain embodiments, the door 14 may include a first half and a second half pivotally secured to the canister 13 by a hinge 16. When the canister 13 is released from the shoot of the aircraft 11, the doors 14 may pivot open and released the pods 18.

The pods 18 of the present invention may include a sidewall made of a floatable translucent material, such as a plastic. The light 22 and the battery 20 may be located within the sidewall. Each of the pods 18 may include an inflator 24. The inflator 24 may be activated when the pods 18 are released from the canister 13, thereby inflating the pods 18. The pods 18 may also include a parachute to provide a gentle landing on ground or sea.

The light 22 of the present invention may include a pulsating light, making the light 22 more visible to flying aircraft and satellites. For example, the light 22 may be a strobe light. In certain embodiments, to conserve battery 20, the pods 18 may include a light sensor 28. The light sensor 28 may be oriented away from the light 22 of the pods 18. When the light sensor 28 senses light, the light 22 is turned off. For example, during the day, sunlight may trigger the light sensor 28 to power the light 22 off. During the night, when the light sensor 28 does not detect light, the light 22 may be powered by the battery 20 and turned on.

In certain embodiments, the light sensor 28 detects light intensity. Therefore, the light sensor 28 may determine a time period for dusk and dawn. The speed of the earth's rotation would be used. The time period of dusk and dawn may be transmitted via radio signal. The search party may receive the radio signal and determine the latitude location of the pod 18 by the strength of the radio signal.

The pod 18 of the present invention may include a plurality of lights 22. Lights 22 may be oriented on the top and bottom side of the pods 18. In certain embodiments, the present invention may include a water detector 26. The water detector 26 may detect water, and light up the side of the balloon 18 that is facing away from the water.

The present invention may include an alternative aircraft locating system 40. The alternative aircraft locating system 40 may include the pod 43. The pod 43 may include, a global position system 46, at least one flight recorder 48, such as two flight recorder 48 (a flight recorder and a backup flight recorder), and a data recorder 50. The flight recorder 48 may record data until the pod is ejected. The data may include, but is not limited to, the aircraft speed, location, altitude and the like. The data may be transmitted from an antenna 30 secured to each of the pods 18. In certain embodiments, the present invention may include the data recorder may record the coordinates of where the pod 43 was released from the aircraft 11 and the coordinates periodically (every ten seconds) of the pods 43 current location. The coordinates may be broadcasted via the antenna 30.

In certain embodiments, the pods 43 may further include attached retrieval rings 44. Therefore, drones 42 that include hooks may pick the pods 43 out of the water. Further, someone may repel from a helicopter and place a clamp in the ring 44 and pull the pod 43 back into the helicopter.

The present invention may include a first pinger 45, such as a top ping, and a second pinger 52, such as a bottom underwater ping. The first pinger 45 may run for three to four months. A timing unit may begin when the pinger starts. When the timer has measured 12 to 16 weeks at the end of this time the second pinger 52 with the same ping turns on. An indicating unit can be added and a signal may be sent to a chip that would start the second pinger 52. Additional pingers could be added. The signal may last for about thirty two weeks or longer.

The battery 20 mentioned above may power the pingers 45, 52, as well as the inflator 24, the sensors 26, 28, the light 22, the broadcasting antenna 30 and any other device of the pod 18 that needs to be powered. In certain embodiments, the present invention may include a solar cell that charges the battery 20 when it is nearly depleted.

In certain embodiments, each pod 18 may include a display screen, such as an LED screen. The screen may display two letters. These letters are generated by a computer program software in base 36, numbers including 0-9 and A-Z. A computerized system keeps track of all flights and all codes worldwide. The screen would display two letters of identifying the aircraft 11 in which it was deployed from.

It should be understood, of course, that the foregoing relates to exemplary embodiments of the invention and that modifications may be made without departing from the spirit and scope of the invention as set forth in the following claims.

What is claimed is:

1. A system for locating a downed aircraft comprising:
   a canister comprising an internal housing and a door covering an opening leading into the internal housing, wherein the door is opened when the canister is deployed from an aircraft;
   a plurality of inflatable pods each comprising a light and a battery powering the light, wherein
   the plurality of inflatable pods comprise deployed position and a stowed position, wherein the stowed position comprises the inflatable pods deflated within the canister, and the deployed position comprises the inflatable pods released through the opening of the canister and inflated.

2. The system of claim 1, further comprising a parachute attached to the canister.

3. The system of claim 1, wherein the door is secured to the canister by a hinge.

4. The system of claim 1, wherein the light is a pulsating light.

5. The system of claim 1, wherein the plurality of inflatable pods each comprise a sidewall comprising a floatable translucent material, wherein the light is contained within the sidewall.

6. The system of claim 1, wherein the plurality of inflatable pods each comprise an inflator activated when the plurality of inflatable pods are released from the canister.

7. The system of claim 1, wherein the plurality of inflatable pods each comprise a light sensor, wherein the light is powered off when light is detected by the light sensor.

8. The system of claim 1, wherein the plurality of inflatable pods each comprise a global positioning system and a data collector.

9. The system of claim 1, wherein the plurality of inflatable pods each comprise a first pinger extending from a first end and a second pinger extending from an opposite end of the first end.

10. The system of claim 1, wherein the plurality of inflatable pods each comprises a retrieval ring protruding from an outer surface.

11. The system of claim 1, further comprising a plane comprising a shoot retaining the canister, and a deploy switch operable to release the canister from the shoot.

12. The system of claim 11, wherein the plane comprises an altitude sensor operable to control the deploy switch.

* * * * *